(12) United States Patent
Maruyama et al.

(10) Patent No.: US 7,036,624 B2
(45) Date of Patent: May 2, 2006

(54) POWER STEERING SYSTEM

(75) Inventors: Tatsuyoshi Maruyama, Kanagawa (JP); Takahide Kaneko, Kanagawa (JP)

(73) Assignee: Unisia JKC Steering Systems Co., Ltd., Atsugi (JP)

( * ) Notice: Subject to any disclaimer, the term of this patent is extended or adjusted under 35 U.S.C. 154(b) by 143 days.

(21) Appl. No.: 10/784,210

(22) Filed: Feb. 24, 2004

(65) Prior Publication Data
US 2004/0163877 A1 Aug. 26, 2004

(30) Foreign Application Priority Data
Feb. 26, 2003 (JP) ............................. 2003-048713

(51) Int. Cl.
*B62D 5/06* (2006.01)
(52) U.S. Cl. ........................................ 180/417; 180/444
(58) Field of Classification Search ............... 180/417, 180/444, 428; 74/422; 280/93.515
See application file for complete search history.

(56) References Cited

U.S. PATENT DOCUMENTS

| | | | | |
|---|---|---|---|---|
| 4,527,465 A | * | 7/1985 | Yoshida et al. | 92/136 |
| 6,186,268 B1 | * | 2/2001 | Onodera et al. | 180/444 |
| 6,193,008 B1 | * | 2/2001 | Hafermalz | 180/428 |
| 6,464,034 B1 | * | 10/2002 | Toda et al. | 180/444 |
| 6,722,465 B1 | * | 4/2004 | Ballester | 180/428 |

FOREIGN PATENT DOCUMENTS

JP  6-22156 U  3/1994

* cited by examiner

*Primary Examiner*—Tony Winner
(74) *Attorney, Agent, or Firm*—Foley & Lardner LLP

(57) ABSTRACT

A power steering system includes a first R-shaped portion formed with a cylindrical wall and curvedly extending from an outer-periphery general face of the cylindrical wall to the outer periphery of a butt wall, and a second R-shaped portion formed with the cylindrical wall and arranged between the butt wall and the first R-shaped portion, wherein the second R-shaped portion is smaller in radius of curvature than the first R-shaped portion.

13 Claims, 4 Drawing Sheets

POWER STEERING SYSTEM

BACKGROUND OF THE INVENTION

The present invention relates generally to a power steering system for a motor vehicle, and more particularly, to its improvement in a connection between a gear housing for accommodating a steering-force transmitting gear and a cylinder sleeve of a assisting power cylinder.

As disclosed in JP-U 6-22156, a typical power steering system for a motor vehicle comprises a cylinder sleeve of a power cylinder connected to a gear housing for accommodating a steering-force transmitting gear such as a rack-and-pinion.

In the power steering system, a cylindrical wall and a butt wall substantially orthogonal thereto are provided to a connection of the gear housing with the power cylinder. The cylinder sleeve is engaged on the outer periphery of the cylindrical wall to have a front-end face abutting on the butt wall. At an engagement of the cylinder wall and the cylinder sleeve, a connecting corner between the cylindrical wall and the butt wall often undergoes stress in a concentrated way, and is thus formed to have an R-shape as large as possible.

With the typical power steering system, however, due to the cylinder sleeve being thin, the R-shape of the connecting corner cannot be formed with sufficiently large radius of curvature, raising a problem of limited relief of stress concentration.

Specifically, favorable achievement of the positioning accuracy of the cylinder sleeve with respect to the gear housing needs plane butt of the front-end face of the cylinder wall on the butt wall. However, with increasing radius of curvature of the R-shape on the gear-housing side, a flat portion of the front-end face of the cylinder sleeve should be narrowed. Thus, due to adjustment between the two requirements, the typical power steering system is restricted in increase in the radius of curvature of the R-shape.

SUMMARY OF THE INVENTION

It is, therefore, an object of the present invention to provide a power steering system for a motor vehicle, which allows sufficient relief of stress concentration at the connection between the cylinder wall and the butt wall without causing any reduction in the positioning accuracy of the cylinder sleeve with respect to the gear housing.

The present invention provides generally a power steering system, which comprises: a power cylinder, the power cylinder comprising a sleeve and a piston rod accommodated therein; a steering-force transmitting gear linked to the piston rod; a gear housing which accommodates the steering-force transmitting gear; a cylindrical wall formed with the gear housing, the cylindrical wall comprising an outer-periphery general face; a butt wall formed with the gear housing, the butt wall being substantially orthogonal to the cylindrical wall, the sleeve of the power cylinder being engaged on an outer periphery of the cylindrical wall with an end face of the sleeve abutting on the butt wall; a first R-shaped portion formed with the cylindrical wall, the first R-shaped portion curvedly extending from the outer-periphery general face to an outer periphery of the butt wall; and a second R-shaped portion formed with the cylindrical wall, the second R-shaped portion being arranged between the butt wall and the first R-shaped portion, the second R-shaped portion being smaller in radius of curvature than the first R-shaped portion.

An essential feature of the present invention lies in providing a method of manufacturing a power steering system, which comprises: casting a gear housing; machining a surface of the cast gear housing; and connecting a cylinder sleeve to the machined gear housing, wherein the casing step provides a cylindrical wall, a butt wall substantially orthogonal to the cylindrical wall, and a first R-shaped portion curvedly extending from an outer-periphery general face of the cylindrical wall to an outer periphery of the butt wall, wherein the machining step provides the cylindrical wall, the butt wall, and a second R-shaped portion arranged between the butt wall and the first R-shaped portion and being smaller in radius of curvature than the first R-shaped portion, and wherein the connecting step provides an end of the cylinder sleeve inserted in the gear housing and abutting on the butt wall, whereby the cylinder sleeve is fixedly engaged with the gear housing.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
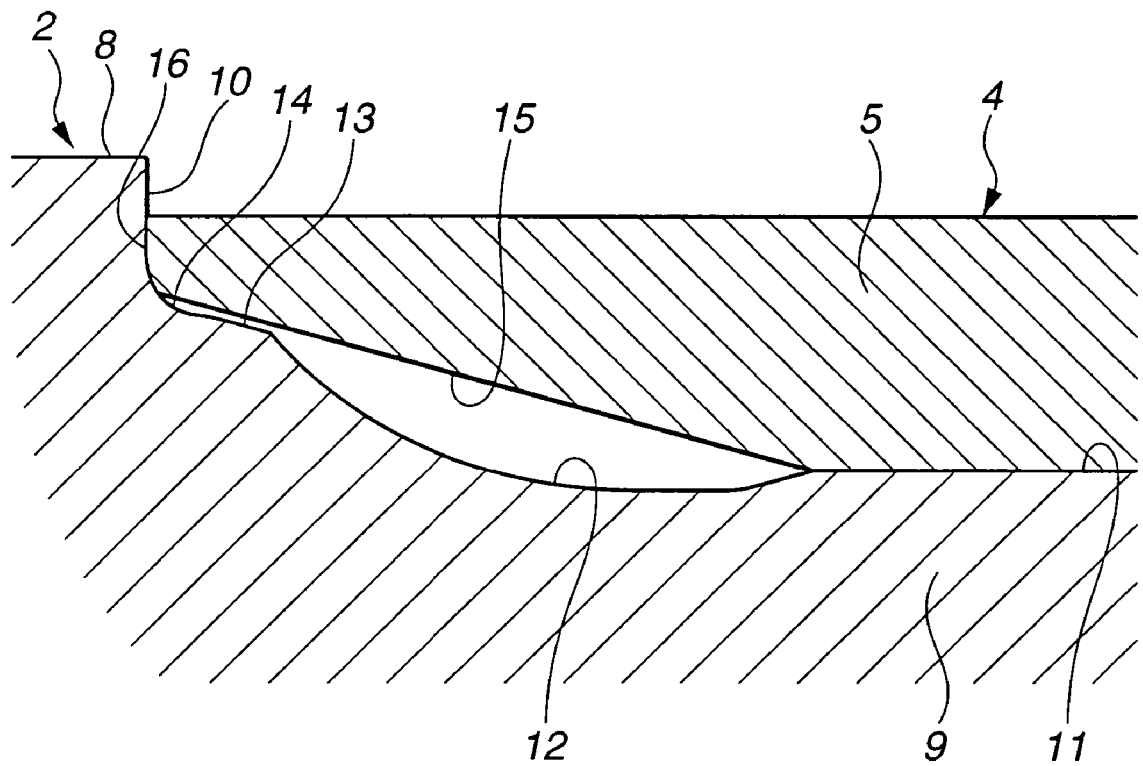
FIG. 1 is an enlarged sectional view showing a portion A in FIG. 2.

Referring to the drawings, a description is made about an embodiment of a power steering system for a motor vehicle according to the present invention.

Figure 2:
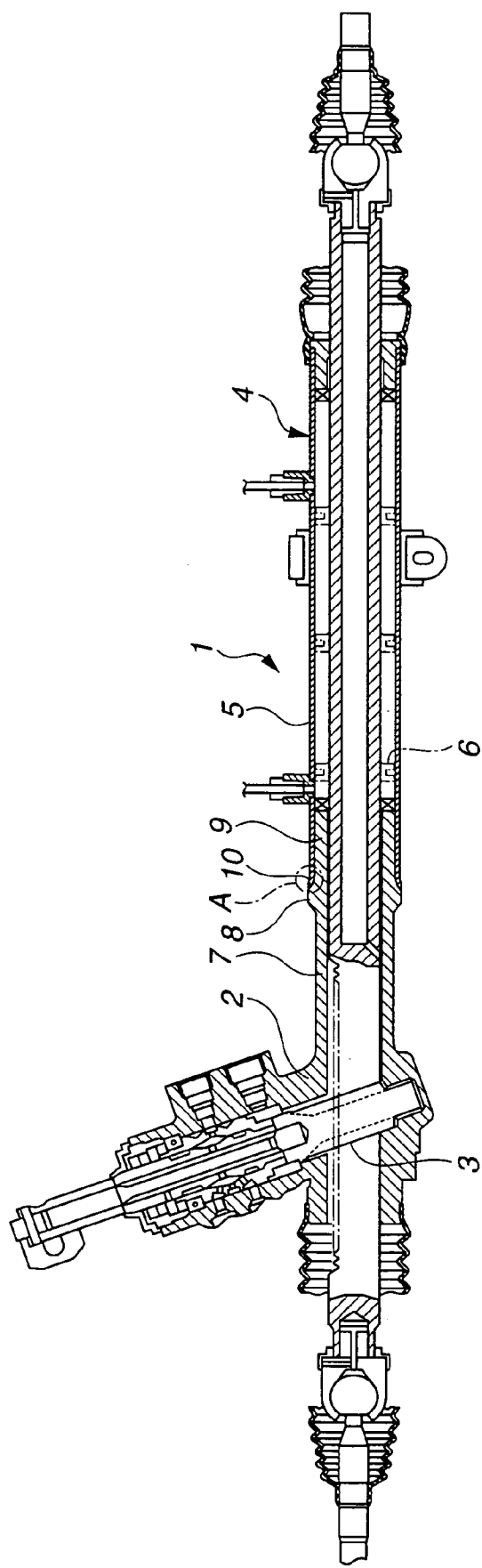
FIG. 2 is a longitudinal sectional view showing an embodiment of a power steering system according to the present invention.

Referring to FIG. 2, a power steering system 1 comprises a gear housing 2 for accommodating a rack-and-pinion or steering-force transmitting gear 3, and an assisting power cylinder 4 connected to gear housing 2. Power cylinder 4 comprises a cylinder sleeve 5 which forms a cylinder main body and a piston rod 6 accommodated therein and operated hydraulically to move forward and backward. Piston rod 6 has one end integrated with the rack of rack-and-pinion 3.

A rack guide 7 is arranged to extend from gear housing 2 so as to accommodate the rack of rack-and-pinion 3, and has at the front end a thick swelling 8 and a cylindrical wall 9 having reduced diameter with respect thereto, which are formed continuously. Referring also to FIG. 1, a butt wall 10 is arranged between swelling 8 and cylindrical wall 9 to be orthogonal to cylindrical wall 9. Cylinder sleeve 5 of power cylinder 4 is engaged with cylindrical wall 9, and then fixed thereto by caulking or the like.

As shown in FIG. 1, cylindrical wall 9 includes a first R-shaped portion 12 which gently curvedly extends from an outer-periphery general face 11 located on the front-end side to the outer periphery of butt wall 10. A stepped connecting face 13 is formed with an end of first R-shaped portion 12 to connect first R-shaped portion 12 and butt wall 10 at a position radially outward of general face 11. A second R-shaped portion 14 having smaller radius of curvature than that of first R-shaped portion 12 is formed with a connection between connecting face 13 and butt wall 10.

In the embodiment, first R-shaped portion 12 is dented slightly radially inward with respect to general face 11. Connecting face 13 extends, with an angle changed substantially in the axial direction, from the curved surface of first R-shaped portion 12 spreading toward an outer-peripheral edge of butt wall 10, and is continuously connected to the base of butt wall 10 with the diameter gently increasing in a sector way.

A sector chamfer 15 is formed with an inner-peripheral edge of cylinder sleeve 5 located on the front-end side, and a front-end face 16 of cylinder sleeve 5 includes a flat surface perpendicular to the outer peripheral face of cylinder sleeve 5. The radial width of front-end face 16 is reduced by part of chamfer 15.

As described above, power steering system 1 is constructed such that outer-periphery general face 11 of cylindrical wall 9 is connected to butt wall 10 through first R-shaped portion 12 having larger radius of curvature, stepped connecting face 13, and second R-shaped portion having smaller radius of curvature. Thus, stress concentration involved in the connection between cylindrical wall 9 and butt wall 10 can be reduced on the whole as compared with the related art.

Figure 3:
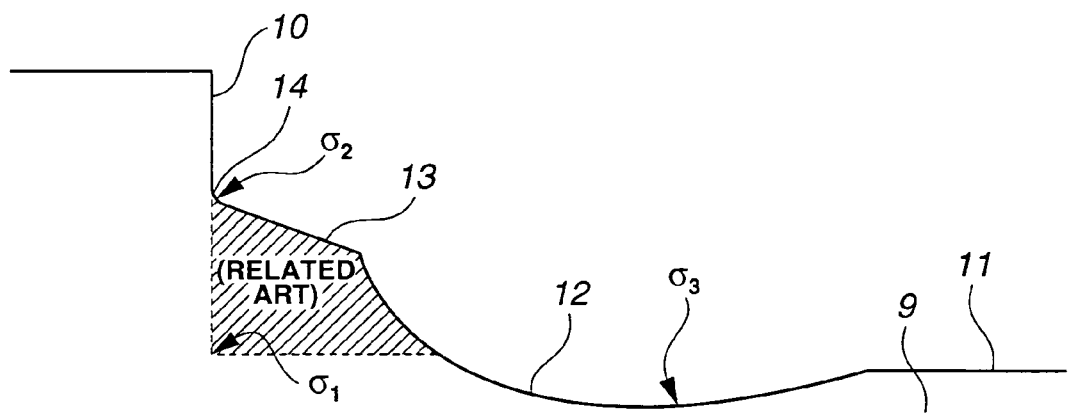
FIG. 3 is a schematic view showing a sectional shape in the embodiment and in the related art.
Figure 4:
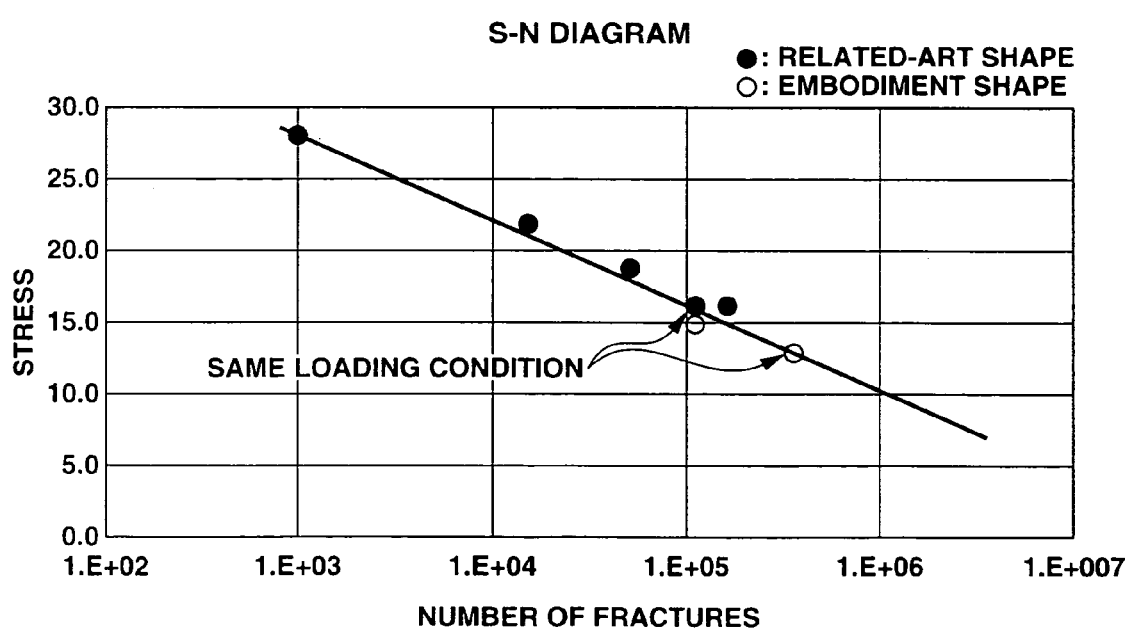
FIG. 4 is a graph illustrating the relationship between stress and number of fractures obtained by varying applied repeated load.

Referring to FIGS. 3 and 4, the principle of possible reduction in stress concentration is described. FIG. 3 shows a sectional shape of the connection between the cylindrical wall and the butt wall, wherein the sectional shape of the embodiment is indicated by solid line, and that of the related art is indicated by broken line. Note that the related art adopts a single R-shaped portion and the same material as that of the embodiment. FIG. 4 shows a graph illustrating the relationship between stress and number of fractures obtained by varying applied repeated load with regard to an article of the embodiment and that of the related art.

Stress σ acting on a concave portion in the embodiment can be calculated from the following equations (1) and (2):

$$\sigma = (Zo/Z) \times (k/ko) \times \epsilon \times E \quad (1)$$

$$Z, Zo = \pi/32 \times (D^4 - d^4)/D \quad (2)$$

wherein (Zo/Z) is a ratio between a section modulus Zo of the embodiment article and that one Z of the related-art article, (k/ko) is a ratio between a stress concentration k of the embodiment article and that one ko of the related-art article, ϵ is a distortion factor, E is a Young's modulus, D is an outer diameter of shank, and d is an inner diameter of shank.

In equation (1), section-modulus ratio Zo/Z becomes smaller as the shank outer diameter D of the embodiment article becomes larger, and stress-concentration ratio k/ko also becomes smaller as the radius of curvature of the generally R-shaped portion of the embodiment article becomes larger. Therefore, when considering first R-shaped portion 12 of the embodiment article, it has smaller section-modulus ratio Zo/Z than that of the related-art article, and larger stress-concentration ratio k/ko than that of the related-art article. However, since stress a is determined by the product of section-modulus ratio Zo/Z and stress-concentration ratio k/ko, it can be reduced as compared with the related-art article by sufficiently increasing the radius of curvature of first R-shaped portion 12 with respect to reduction in shank outer diameter D. Specifically, suppose that stress acting on the R-shaped portion of the related-art article is σ1, and stress acting on first R-shaped portion 12 (at minimum outer-diameter section) of the embodiment article is σ3, the relationship σ1>σ3 can be obtained.

Regarding second R-shaped portion 14 having smaller radius of curvature than that of first R-shaped portion 12, it can provide larger stress σ2 than that of the related-art article by sufficiently increasing shank outer diameter D (outer diameter of the base of connecting face 13), i.e. the relationship σ1>σ2 can be obtained.

In the embodiment, stress σ2 acting on second R-shaped portion 14 is set to be equal to or slightly smaller than stress σ3 acting on first R-shaped portion 12. That is, the relationship between σ1, σ2, σ3 is given by σ1>σ3≧σ2.

Therefore, referring to FIG. 4, when applying the same repeated load to the embodiment article and the related-art article, the embodiment article is surely larger than the related-art article in the number of repetition counted until the product comes to fracture, obtaining a great reduction in stress concentration.

As described above, in the embodiment, stress concentration can surely be reduced as compared with the related-art article. Moreover, since stepped connecting face 13 is arranged between first and second R-shaped portions 12, 14, butt wall 10 can secure a sufficient butt area with respect to the front-end face of cylinder sleeve 5. This allows a sufficient increase in the flat portion of front-end face 16 of cylinder sleeve 5, resulting in enhancement in the accuracy of axial positioning of cylinder sleeve 5.

Further, in the embodiment, since connecting face 13 is formed to have the diameter increasing toward butt wall 10 in a sector way, the radius of curvature of second R-shaped portion 14 can be increased as compared with when connecting face 13 is formed like a straight cylinder. This allows a further increase in the radius of curvature of second R-shaped portion 14.

Furthermore, in the embodiment, since first R-shaped portion 12 is dented radially inward with respect to general face 11, cylindrical wall 9 has less radially outward swelling at the position close to general face 11, resulting in surer elimination of interference when engaging cylinder sleeve 5 with cylindrical wall 9.

All the surface of cylindrical wall 9 from general face 11 to butt wall 10 can be finished by machining or the like. Optionally, the following working may advantageously adopted to obtain further enhancement in the strength of first R-shaped portion 12.

Figure 5:
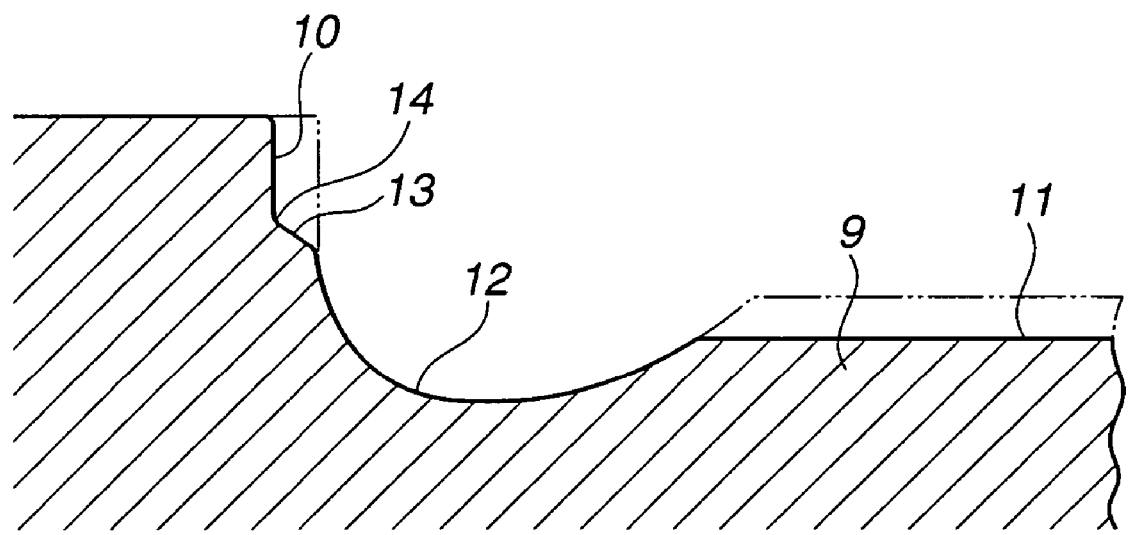
FIG. 5 is a view similar to FIG. 1, showing a machining process in the embodiment.

Referring to FIG. 5, first R-shaped portion 12 is previously formed during casting of cylindrical wall 9 as indicated by two-dot chain line. Then, machining is carried out on the surface of cast cylindrical wall 9 except an area corresponding to first R-shaped portion 12 as indicated by solid line, thus achieving accurate formation of general face 11, second R-shaped portion 14, and butt wall 10 on cylindrical wall 9. Since first R-shaped portion 12 is dented radially inward, it can easily be left as a unmachined part by carrying out simple machining to general face 11.

Gear housing 2 obtained in such a way has a cast face with higher hardness remaining on the surface of first R-shaped portion 12, contributing to enhancement in the hardness of first R-shaped portion 12, resulting in great advantage in terms of enhancement in the fracture strength of the product.

According to the present invention, two R-shaped portions are formed by the first R-shaped portion having larger radius of curvature and the second R-shaped portion arranged radially outward of the first R-shaped portion and having smaller radius of curvature, and the cylindrical wall and the butt wall are connected to each other through the two R-shaped portions. Thus, appropriate setting of the radius of curvature and shank diameter, i.e. radial height, of each R-shaped portion allows sure prevention of stress from concentrating on part of the base of the cylindrical wall. Specifically, note that stress acting on the base of the cylindrical wall is determined by the radius of curvature and radial sectional shape of the concave portion. According to the present invention, the first R-shaped portion arranged radially inward and thus having smaller sectional shape has larger radius of curvature, and the second R-shaped portion having smaller radius of curvature is arranged radially outward, resulting in possible reduction in stress acting on both R-shaped portions. Therefore, according to the present invention, stress concentration at the connection between the cylindrical wall and the butt wall can surely be prevented without producing any inconvenience of reducing the positioning accuracy of the cylinder sleeve with respect to the gear housing.

Further, the butt wall can secure a sufficient butt area with respect to the front-end face of the cylinder sleeve. This allows a sufficient increase in the flat portion of the front-end face of the cylinder sleeve, resulting in enhancement in the accuracy of axial positioning of the cylinder sleeve.

Still further, the radius of curvature of the second R-shaped portion can be increased as compared with when the connecting face is formed like a straight cylinder. This allows a further increase in the radius of curvature of the second R-shaped portion.

Still further, the cylindrical wall has less radially outward swelling at the position close to the outer-periphery general face, resulting in sure elimination of interference when engaging the cylinder sleeve with the cylindrical wall.

Furthermore, the gear housing comprises a gear housing obtained by casting, and the cylindrical wall comprises a cylindrical wall obtained by machining from the outer-periphery general face to the butt wall except an area corresponding to the first R-shaped portion, whereby the first R-shaped portion includes a cast face. Therefore, accurate machining is carried out on the outer-periphery general face of the cylindrical wall with which the cylinder sleeve engages and the surface of the butt wall on which the front end face of the cylinder sleeve abuts. A cast face with higher hardness remains on the first R-shaped portion which fails to contact the cylinder sleeve. Therefore, the strength of the first R-shaped portion which often undergoes stress in a concentrated way can further be increased without producing a reduction in the assembling accuracy.

Further, the sleeve of the power cylinder comprises an inner peripheral face having a diameter increasing toward the end face of the sleeve of the power cylinder in a sector way. Therefore, there arises no interference between the first and second R-shaped portions and the cylinder sleeve. Optionally, interference between the first and second R-shaped portions and the inner peripheral face of the cylinder sleeve can be prevented by thinning the inner peripheral face of the cylinder sleeve so as to achieve uniform thickness of the front end thereof. The present invention allows effective prevention of stress from concentrating on the front end of the cylinder sleeve as compared with this variation.

Still further, the present invention could have a connecting face with the cylindrical wall, the connecting face being arranged between the first and second R-shaped portions, the connecting face serving to connect the first R-shaped portion to the second R-shaped portion at a position radially outward of the outer-peripheral general face of the cylindrical wall, the connecting face having a diameter increasing toward the end face of the sleeve of the power cylinder in a sector way, the sector angle of the inner peripheral face of the sleeve substantially corresponding to a sector angle of the connecting face. Therefore, the thickness of the gear housing at the connection can be secured maximally.

Furthermore, the peripheral face of the sleeve has an end formed with a butt face abutting on the butt wall. Therefore, axial positioning of the cylinder sleeve with respect to the butt wall of the gear housing can be achieved accurately.

Further, the butt wall of the gear housing and the butt face of the cylinder sleeve are perpendicular to an axis of the power steering system, resulting in sure prevention of axial positional displacement between the two. Note that when sector faces are formed on the butt wall of the gear housing and the butt face of the cylinder sleeve, respectively, axial positional displacement between the two may occur along the sector faces.

Furthermore, the power steering system can be manufactured more easily since the first R-shaped portion is not formed by machining, resulting in enhancement in the manufacturing efficiency of the system. Moreover, a cast face remains on the first R-shaped portion, allowing enhancement in the strength of the first R-shaped portion which often undergoes stress in a concentrated way.

Further, the machining step could further provide a connecting face arranged between the first and second R-shaped portions, the connecting face serving to connect the first R-shaped portion to the second R-shaped portion at a position radially outward of the outer-periphery general face of the cylindrical wall. Therefore, the butt wall can secure a sufficient butt area with respect to the front-end face of the cylinder sleeve. This allows a sufficient increase in the flat portion of the front-end face of the cylinder sleeve, resulting in enhancement in the accuracy of axial positioning of the cylinder sleeve.

The entire contents of Japanese Patent Application P2003-048713 filed Feb. 26, 2003 are hereby incorporated by reference.

What is claimed is:

1. A power steering system, comprising:
a power cylinder, the power cylinder comprising a sleeve and a piston rod accommodated therein;
a steering-force transmitting gear linked to the piston rod;
a gear housing which accommodates the steering-force transmitting gear;
a cylindrical wall formed with the gear housing, the cylindrical wall comprising an outer-periphery general face;
a butt wall formed with the gear housing, the butt wall being substantially orthogonal to the cylindrical wall,
the sleeve of the power cylinder being engaged on an outer periphery of the cylindrical wall with an end face of the sleeve abutting on the butt wall;
a first R-shaped portion formed with the cylindrical wall, the first R-shaped portion curvedly extending from the outer-periphery general face to an outer periphery of the butt wall; and
a second R-shaped portion formed with the cylindrical wall, the second R-shaped portion being arranged between the butt wall and the first R-shaped portion, the second R-shaped portion being smaller in radius of curvature than the first R-shaped portion.

2. The power steering system as claimed in claim 1, further comprising a connecting face formed with the cylindrical wall, the connecting face being arranged between the first and second R-shaped portions, the connecting face serving to connect the first R-shaped portion to the second R-shaped portion at a position radially outward of the outer-periphery general face of the cylindrical wall.

3. The power steering system as claimed in claim 2, wherein the connecting face has a diameter increasing toward the second R-shaped portion in a sector way.

4. The power steering system as claimed in claim 1, wherein the first R-shaped portion is dented radially inward with respect to the outer-periphery general face of the cylindrical wall.

5. The power steering system as claimed in claim 1, wherein the gear housing comprises a gear housing obtained by casting, wherein the cylindrical wall comprises a cylindrical wall obtained by machining from the outer-periphery general face to the butt wall except an area corresponding to the first R-shaped portion, whereby the first R-shaped portion includes a cast face.

6. The power steering system as claimed in claim 1, wherein the sleeve of the power cylinder comprises an inner peripheral face having a diameter increasing toward the end face of the sleeve of the power cylinder in a sector way.

7. The power steering system as claimed in claim 6, further comprising a connecting face formed with the cylindrical wall, the connecting face being arranged between the first and second R-shaped portions, the connecting face serving to connect the first R-shaped portion to the second R-shaped portion at a position radially outward of the outer-periphery general face of the cylindrical wall, the connecting face having a diameter increasing toward the end face of the sleeve of the power cylinder in a sector way, wherein a sector angle of the inner peripheral face of the sleeve substantially corresponds to a sector angle of the connecting face.

8. The power steering system as claimed in claim 6, wherein the inner peripheral face of the sleeve has an end formed with a butt face abutting on the butt wall.

9. The power steering system as claimed in claim 8, wherein the butt face of the inner peripheral face of the sleeve is perpendicular to an axis of the power steering system.

10. The power steering system as claimed in claim 1, wherein the first R-shaped portion has cast surface.

11. A method of manufacturing a power steering system, comprising:
   casting a gear housing;
   machining a surface of the cast gear housing; and
   connecting a cylinder sleeve to the machined gear housing,
   wherein the casing step provides a cylindrical wall, a butt wall substantially orthogonal to the cylindrical wall, and a first R-shaped portion curvedly extending from an outer-periphery general face of the cylindrical wall to an outer periphery of the butt wall,
   wherein the machining step provides the cylindrical wall, the butt wall, and a second R-shaped portion arranged between the butt wall and the first R-shaped portion and being smaller in radius of curvature than the first R-shaped portion, and
   wherein the connecting step provides an end of the cylinder sleeve inserted in the gear housing and abutting on the butt wall, whereby the cylinder sleeve is fixedly engaged with the gear housing.

12. The method as claimed in claim 11, wherein the machining step further provides a connecting face arranged between the first and second R-shaped portions, the connecting face serving to connect the first R-shaped portion to the second R-shaped portion at a position radially outward of the outer-periphery general face of the cylindrical wall.

13. A power steering system, comprising:
   a power cylinder, the power cylinder comprising a sleeve and a piston rod accommodated therein;
   a steering-force transmitting gear linked to the piston rod;
   a gear housing which accommodates the steering-force transmitting gear;
   a cylindrical wall formed with the gear housing, the cylindrical wall comprising an outer-periphery general face;
   a butt wall formed with the gear housing, the butt wall being substantially orthogonal to the cylindrical wall,
   the sleeve of the power cylinder being engaged on an outer periphery of the cylindrical wall with an end face of the sleeve abutting on the butt wall;
   a first R-shaped portion formed with the cylindrical wall, the first R-shaped portion curvedly extending from the outer-periphery general face to an outer periphery of the butt wall;
   a second R-shaped portion formed with the cylindrical wall, the second R-shaped portion being arranged between the butt wall and the first R-shaped portion, the second R-shaped portion being smaller in radius of curvature than the first R-shaped portion; and
   a connecting face formed with the cylindrical wall, the connecting face being arranged between the first and second R-shaped portions, the connecting face serving to connect the first R-shaped portion to the second R-shaped portion at a position radially outward of the outer-periphery general face of the cylindrical wall, the connecting face having a diameter increasing toward the end face of the sleeve of the power cylinder in a sector way, wherein a sector angle of the inner peripheral face of the sleeve substantially corresponds to a sector angle of the connecting face.

* * * * *